(12) United States Patent
Zhao et al.

(10) Patent No.: US 11,782,722 B2
(45) Date of Patent: Oct. 10, 2023

(54) INPUT AND OUTPUT INTERFACES FOR TRANSMITTING COMPLEX COMPUTING INFORMATION BETWEEN AI PROCESSORS AND COMPUTING COMPONENTS OF A SPECIAL FUNCTION UNIT

(71) Applicants: BEIJING BAIDU NETCOM SCIENCE AND TECHNOLOGY CO., LTD., Beijing (CN); KUNLUNXIN TECHNOLOGY (BEIJING) COMPANY LIMITED, Beijing (CN)

(72) Inventors: Baofu Zhao, Beijing (CN); Xueliang Du, Beijing (CN); Kang An, Beijing (CN); Yingnan Xu, Beijing (CN); Chao Tang, Beijing (CN)

(73) Assignees: BEIJING BAIDU NETCOM SCIENCE AND TECHNOLOGY CO., LTD., Beijing (CN); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 51 days.

(21) Appl. No.: 17/149,476

(22) Filed: Jan. 14, 2021

(65) Prior Publication Data

US 2021/0406032 A1 Dec. 30, 2021

(30) Foreign Application Priority Data

Jun. 30, 2020 (CN) .......................... 202010612288.3

(51) Int. Cl.
G06F 9/38 (2018.01)
(52) U.S. Cl.
CPC .......... *G06F 9/3877* (2013.01); *G06F 9/3836* (2013.01)

(58) Field of Classification Search
CPC .............................. G06F 9/3836; G06F 9/3877
See application file for complete search history.

(56) References Cited

U.S. PATENT DOCUMENTS

| 5,256,911 A | 10/1993 | Holler et al. |
| 5,371,834 A | 12/1994 | Tawel |

(Continued)

FOREIGN PATENT DOCUMENTS

| CN | 101950282 A | 1/2011 |
| CN | 107980118 A | 5/2018 |

(Continued)

OTHER PUBLICATIONS

Koike, (1990). "Special Purpose hardware for neurocomputing," Journal of electronic information communication engineers, Institute of Electronics, Information and Communication, J73(8):1132-1145, 16 pages.

(Continued)

*Primary Examiner* — David J. Huisman
(74) *Attorney, Agent, or Firm* — Morrison & Foerster LLP

(57) ABSTRACT

A complex computing device, a complex computing method, an artificial intelligence chip and an electronic apparatus are provided. An input interface receives complex computing instructions and arbitrates each complex computing instruction to a corresponding computing component respectively, according to the computing types in the respective complex computing instructions Each computing component is connected to the input interface, acquires a source operand from a complex computing instruction to perform complex computing, and generates a computing result instruction to feed back to an output interface. The output interface arbitrates the computing result in each computing result instruction to the corresponding instruction source (Continued)

respectively, according to the instruction source identifier in each computing result instruction.

16 Claims, 7 Drawing Sheets

(56) References Cited

U.S. PATENT DOCUMENTS

| | | | | |
|---|---|---|---|---|
| 8,055,882 | B2* | 11/2011 | Kashiwagi | G06F 9/3877 |
| | | | | 712/34 |
| 9,535,693 | B2* | 1/2017 | Yamasaki | G06F 9/3001 |
| 2008/0162873 | A1 | 7/2008 | Zimmer et al. | |
| 2009/0106467 | A1* | 4/2009 | Kashiwagi | G06F 9/3885 |
| | | | | 710/120 |
| 2017/0147345 | A1* | 5/2017 | Clevenger | G06F 9/30079 |
| 2017/0308411 | A1 | 10/2017 | Brill | |

FOREIGN PATENT DOCUMENTS

| | | |
|---|---|---|
| CN | 109739556 A | 5/2019 |
| CN | 110825435 A | 2/2020 |
| JP | H0454685 A | 2/1992 |
| JP | H05264645 A | 10/1993 |
| JP | H0628331 A | 2/1994 |
| KR | 20170015000 A | 2/2017 |
| KR | 20200018236 A | 2/2020 |
| WO | WO-2019049842 A1 | 3/2019 |

OTHER PUBLICATIONS

Office Action received for Japanese Patent Application No. 2021-001829 dated Jan. 7, 2022, 9 pages.

Extended European Search Report and Written Opinion for European Patent Application No. 21153232.0, dated Jul. 16, 2021, 11 pages.

Wikipedia, (2020). "Instruction set architecture," available online at <https://en.wikipedia.org/w/index.php?title=Instructionsetarchitecture&oldid=964647624>, 11 pages.

Wikipedia, (2021). "Central processing unit," available online at <https://en.wikipedia.org/w/index.php?title=Central processing unit&oldid=964759453>, 17 pages.

Wikipedia, (2021). "Multistage interconnection networks," available online at <https://en.wikipedia.org/w/index.php?title=Multistage_interconnection_networks&oldid=928794770>, 7 pages.

Office Action received for Korean Patent Application No. 10-2021-0003501 dated Feb. 14, 2023, 14 pages. English translation.

* cited by examiner

INPUT AND OUTPUT INTERFACES FOR TRANSMITTING COMPLEX COMPUTING INFORMATION BETWEEN AI PROCESSORS AND COMPUTING COMPONENTS OF A SPECIAL FUNCTION UNIT

CROSS-REFERENCE TO RELATED APPLICATION

This application claims priority to Chinese patent application No. 202010612288.3, filed on Jun. 30, 2020, which is hereby incorporated by reference in its entirety.

TECHNICAL FIELD

The present application relates to the technical field of artificial intelligence, in particular to the technical field of an artificial intelligence chip.

BACKGROUND

There are many complex computations in an artificial intelligence (AI) algorithm. These complex operations can be implemented in an AI processor by combining a number of basic arithmetic and logical operation instructions.

SUMMARY

The present application provides a complex computing device, a complex computing method, an artificial intelligence chip, and an electronic apparatus.

According to one aspect of the present application, a complex computing device is provided, including an input interface, a plurality of computing components, and an output interface, wherein the input interface is configured for receiving complex computing instructions and arbitrating each of the complex computing instructions to a corresponding computing component respectively, according to computing types in the respective complex computing instructions, wherein the complex computing instruction further includes an instruction source identifier and a source operand for complex computing;

each computing component is connected to the input interface, and the computing component is configured for acquiring the source operand from the received complex computing instruction to perform complex computing and generating computing result instruction to feed back to the output interface, wherein the computing result instruction includes the instruction source identifier in the complex computing instruction and a computing result of the complex computing; and the output interface is configured for arbitrating each of the computing results in the respective computing result instructions to a corresponding instruction source respectively, according to the instruction source identifiers in the respective computing result instructions.

In accordance with another aspect of the present application, an artificial intelligence chip is provided that includes a complex computing device as described above, and a plurality of artificial intelligence processor cores connected to the complex computing device.

According to yet another aspect of the present application, there is provided an electronic apparatus including at least one processor, at least one memory, and at least one artificial intelligence chip as described above.

According to yet another aspect of the present application, a complex computing method is provided, including:

receiving complex computing instructions from a plurality of artificial intelligence processor cores, and arbitrating each complex computing instruction to a corresponding computing component respectively, according to computing types in the respective complex computing instructions, wherein each of the complex computing instructions further comprises an instruction source identifier of an artificial intelligence processor core and a source operand for complex computing;

a computing component acquiring a source operand from the received complex computing instruction to perform complex computing and generating computing result instruction, wherein the computing result instruction includes an instruction source identifier in the complex computing instruction and a computing result of the complex computing; and arbitrating each of the computing results in the respective computing result instructions to a corresponding artificial intelligence processor core as an instruction source, respectively, according to the instruction source identifiers in the respective computing result instructions.

It is to be understood that the content described in this section is neither intended to identify key or critical features of the embodiments of the present application, nor to limit the scope of the application. Other features of the present application will become readily apparent from the following description.

BRIEF DESCRIPTION OF THE DRAWINGS

The accompanying drawings are included to provide a better understanding of the present application and are not to be construed as limiting the present application, wherein.

DESCRIPTION OF REFERENCE NUMERALS

10: AI chip; 100: AI processor core; 200: complex computing device;
210: input interface; 220: computing component; 230: output interface;
211: first master node; 212: first slave node;
213: first address judgment module; 214: first arbitration module;
231: second master node; 232: second slave node;

233: second address judgment module; 234: second arbitration module;
601: processor; 602: memory; 603: input device; 604: output device.

DETAILED DESCRIPTION

Exemplary embodiments of the present application are described below in conjunction with the accompanying drawings, which include various details of the embodiments of the present application to facilitate understanding, and should be considered as merely exemplary. Accordingly, one of the ordinary skills in the art should recognize that various changes and modifications can be made to the embodiments described herein without departing from the scope and spirit of the present application. Also, descriptions of well-known functions and structures are omitted from the following description for clarity and conciseness.

As described above, the complex operations can be implemented in an AI processor by combining a number of basic arithmetic and logical operation instructions. But it is time-consuming and labor-intensive, reduces execution efficiency of these complex operations, and also it is not friendly to software programming.

Currently, an AI processor usually implements a complex computation by calling dedicated complex computing units in a manner of single instruction. Due to the fact that the logic area occupied by the complex computing units is relatively large, if in a multi-core AI processor, each processor core exclusively occupies the complex computing units, a large chip area would be occupied by it and the cost for implementing the multi-core AI processor would be much too high; in addition, in a practical application scenario, frequency of using the complex computing instructions is not particularly high, and the utilization rate of the complex computing units is not very high when each processor core exclusively occupies the complex computing units.

Figure 1:
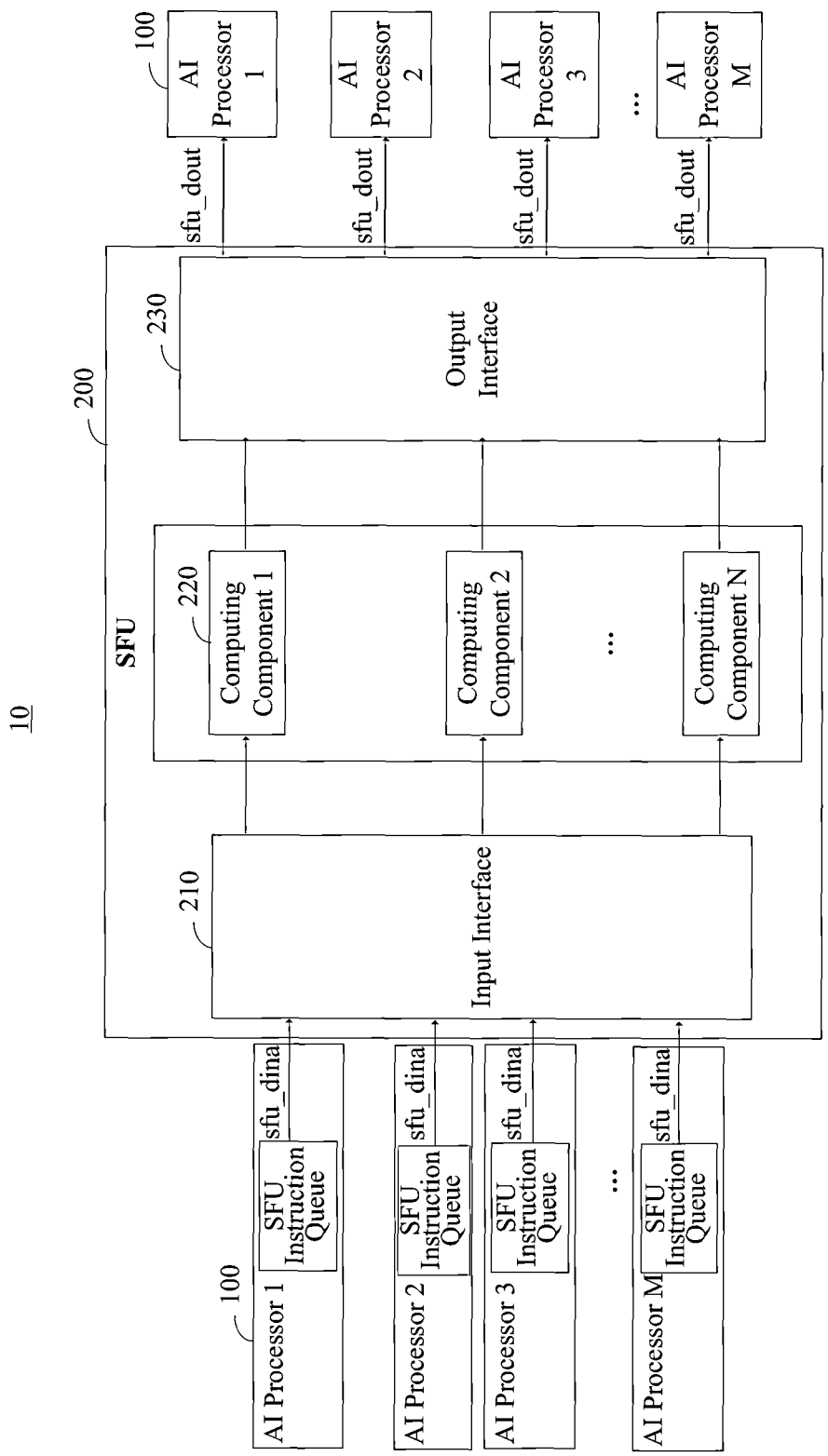
FIG. 1 is a schematic structural diagram of an AI chip according to an embodiment of the present application.

FIG. 1 illustrates a schematic structural diagram of an Artificial Intelligence (AI) chip 10 that may be in accordance with an embodiment of the present application.

As shown in FIG. 1, the AI chip 10 includes a plurality of instruction sources 100 and a complex computing device 200, wherein each of the plurality of instruction sources 100 is connected to a complex computing device 200. In this embodiment, the instruction source 100 may be an AI processor core. Among other things, the complex computing device 200 includes an input interface 210, a plurality of computing components 220, and an output interface 230. The input interface 210 may be connected between the plurality of AI processor cores 100 and the plurality of computing components 220, and the output interface may be connected between the plurality of computing components 220 and the plurality of AI processor cores 100.

A plurality of computing elements 220 may form a Special Function Unit (SFU), each computing component 220 having an independent operational capability to implement some type of complex computing. A complex operation herein refers to an operation that is computationally large relative to a simple operation, which may refer to an operation that is computationally small. For example, a simple operation may be an addition operation, a multiplication operation, or a simple combination operation of an addition operation and a multiplication operation. Each of the instruction sources 100, such as the AI processor core, includes an adder and a multiplier. Therefore, it is more suitable for performing simple operations by the AI processor core. A complex operation refers to an operation which cannot be formed by a simple combination of an addition operation and a multiplication operation, such as a floating-point exponentiation operation, a floating-point square root operation, a floating-point division operation, a floating-point logarithm operation, a trigonometric function operation and the like.

In one example, computing component 1 is configured to implement a floating-point exponentiation operation; computing component 2 is configured to implement a floating-point square root operation; . . . ; computing component N is configured to implement a trigonometric function operation.

According to one embodiment, the computing component 220 may include at least one of Application Specific Integrated Circuit (ASIC) chip and Field Programmable Gate Array (FPGA).

In one example, an instruction source, such as an AI processor core 100, may decode an instruction to be executed upon receipt of the instruction to be executed and splice the decoded data into a complex computing instruction such as sfu_dina. The complex computing instruction may include a computing type (the manipulation type of the complex computing), an instruction source identifier (e.g., core ID of an AI processor core), a source operand, a write-back address, etc. In one example, the AI processor core 100 adds the generated complex computing instruction sfu_dina to a dedicated SFU instruction queue. The SFU instruction queue is a First Input First Output (FIFO) queue.

Each instruction source, such as the AI processor core 100, may issue an instruction request req1 to the input interface 210 of the complex computing device 200. The input interface 210 acquires the complex computing instruction sfu_dina from each AI processor core 100 in response to the instruction request, and arbitrates each complex computing instruction sfu_dina to the corresponding computing component 220 respectively, according to the computing type in each complex computing instruction sfu_dina.

For example: if the computing type in sfu_dina1 is a floating-point square root operation, the input interface 210 arbitrates sfu_dina1 to the computing unit 2; if the computing type in sfu_dina2 is a floating-point exponentiation operation, the input interface 210 arbitrates sfu_dina2 to the computing unit 1.

The computing component 220 is configured for acquiring a source operand from the received complex computing instruction sfu_dina to perform complex computing, generating a computing result instruction sfu_dout, and feeding it back to the output interface 230. The computing result instruction sfu_dout may include an instruction source identifier, a computing result, a write-back address, etc. Here, the computing result is the computing result of the computing component 220 performing complex computing on the source operand, and the instruction source identifier and the write-back address are from data in the complex computing instruction sfu_dina received by the computing unit 220.

For example, the computing component 1 receives a complex computing instruction sfu_dina2, wherein the sfu_dina2 includes source operands X and Y, a write-back address Z, an instruction source identifier AA and the like, and the computing component 1 performs floating-point exponentiation operation on the source operands X and Y, splices the computing result, the write-back address Z, the instruction source identifier AA and the like into a computing result instruction sfu_dout1 and feeds it back to the output interface 230.

The output interface 230 receives computing result instructions sfu_dout1, sfu_dout2 ... sfu_doutN from each computing component 220, and arbitrates the computing result and write-back address in each computing result instruction to the corresponding instruction source (such as an AI processor core 100) respectively, based on the instruction source identifier in each computing result instruction. The AI processor core 100 writes the computing result into an internal register based on the write-back address.

According to the embodiment of the present application, the complex computing device 200 is weakly coupled with each instruction source (such as the AI processor core 100), various complex computing instructions use the same data path (the input interface 210) and are sent to the corresponding computing components, and the respective computing result instructions also use the same data path (the output interface 230) to return to the respective instruction sources, so that a SFU shared by multiple instruction sources is realized, and the data paths when the instruction sources call the SFU for complex computing can be reduced, and the area cost and the power consumption of the AI chip can be decreased.

In one embodiment, input interface 210 and output interface 230 are in a structure of crossbar-array-type.

Figure 2:
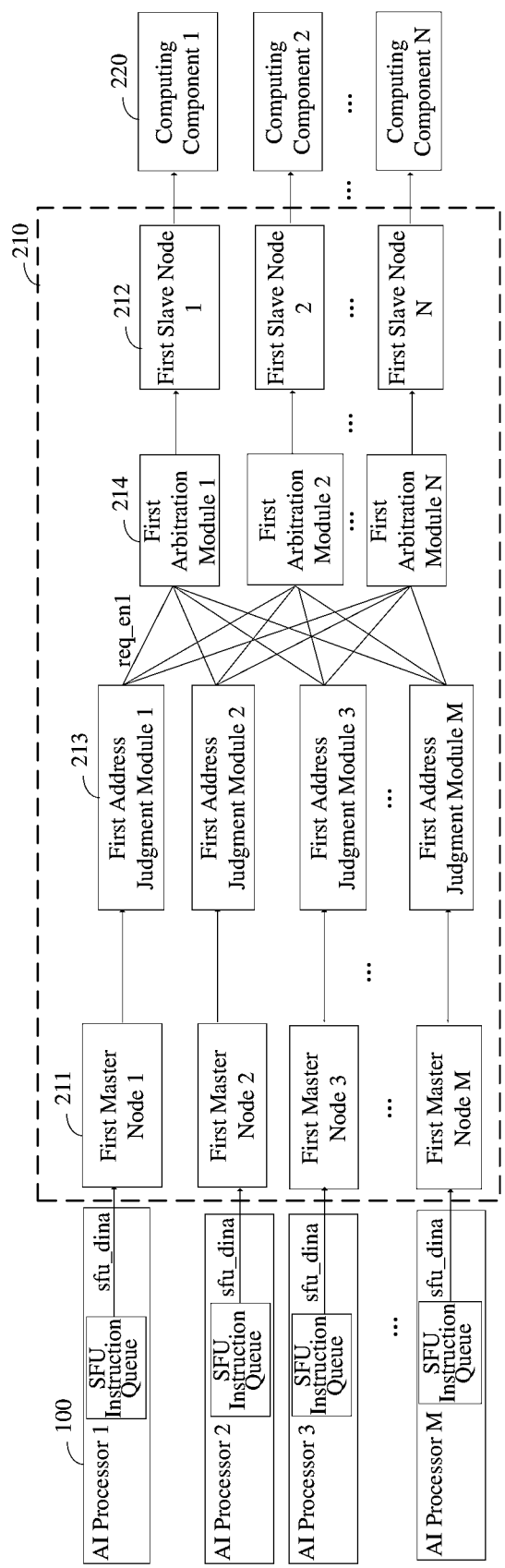
FIG. 2 is a schematic structural diagram of an input interface of a complex computing device according to an embodiment of the present application.

As shown in FIG. 2, the input interface 210 may include a plurality of first master nodes 211 and a plurality of first slave nodes 212. Wherein, each first slave node 212 is connected to each first master node 211, respectively, and each first slave node 212 is connected to each computing component 220 in one-to-one correspondence manner That is, the input interface 210 may be a master-slave structure type. In one example, each first master node 211 is connected, in one-to-one correspondence, to each AI processor core 100.

Therefore, the first master node 211 can acquire a corresponding complex computing instruction from the connected AI processor core 100 and arbitrate the acquired complex computing instruction to the corresponding first slave node 212 according to the computing type in the acquired complex computing instruction; the first slave node 212 may send the received complex computing instruction to the connected computing component 220.

In one embodiment, as shown in FIG. 2, the input interface 210 may further include a plurality of first address judgment modules 213 and a plurality of first arbitration modules 214, wherein each first master node 211 is connected to each first address judgment module 213 in one-to-one correspondence, each first arbitration module 214 is connected to each first address judgment module 213, and each first arbitration module 214 is connected to each first slave node 212 in one-to-one correspondence.

Therefore, the first address judgment module 213 may receive the corresponding complex computing instruction from the connected first master node 211, compare the instruction type in the received complex computing instruction with each of the connected first slave node 212, and output a first request enabling valid signal, i.e., req_en1 is valid, if the comparison result is that they are matched.

In one example, the data in each first master node 211 includes an instruction request signal req1, a first address signal addr1, a first data signal data1, and an instruction response signal gnt1. The first address signal addr1 includes a computing type in the complex computing instruction sfu_dina, and the first data signal data1 includes an instruction source identifier, a source operand, a write-back address and the like in the complex computing instruction sfu_dina.

That is, each first master node 211, after receiving the complex computing instruction sfu_dina, takes a computing type in the complex computing instruction sfu_dina as the first address signal addr1 of the first master node 211, and takes the instruction source identifier, the source operand, the write-back address, etc. in the complex computing instruction sfu_dina as the first data signal data1 of the first master node 211.

Each first address judgment module 213 compares the first address signal addr1 of the first master node 211 connected to the first address judgment module 213 with the sequence number of each first slave node 212. If they are matched, req_en1 is outputted as a valid signal (a first request enabling valid signal) to the first arbitration module 214 connected to the corresponding first slave node 212; if they are not matched, req_en1 is outputted as an invalid signal (first request enabling invalid signal). Here, "matched" may be equal.

The first arbitration module 214 is configured for determining a first target request enabling valid signal from a plurality of outputted first request enabling valid signals, according to a preset arbitration algorithm, and gating the first master node 211 corresponding to the first target request enabling valid signal and the first slave node 212 connected to the first arbitration module 214. Herein, the arbitration algorithm includes, but is not limited to, priority arbitration algorithm, polling arbitration algorithms, and the like.

In one example, the data in each first slave node 212 includes a valid signal vld and a data signal data'. Each first slave node 212 corresponds to one first arbitration module 214. Each of the first arbitration modules 214 receives req_en1 signals generated by the first address judgment modules 213 to which all of the first master nodes 211 are connected, and performs arbitration selection on valid req_en1 signals so as to gate one first master node 211 therefrom, that is, to gate the first master node 211 corresponding to the first target request enabling valid signal and the first slave node 212 connected to the first arbitration module 214. When a first master node 211 and a first slave node 212 are gated, the signal data1 of the first master node 211 may be assigned to the signal data' of the first slave node and the signal vld of the first slave node is set as valid.

Figure 3:
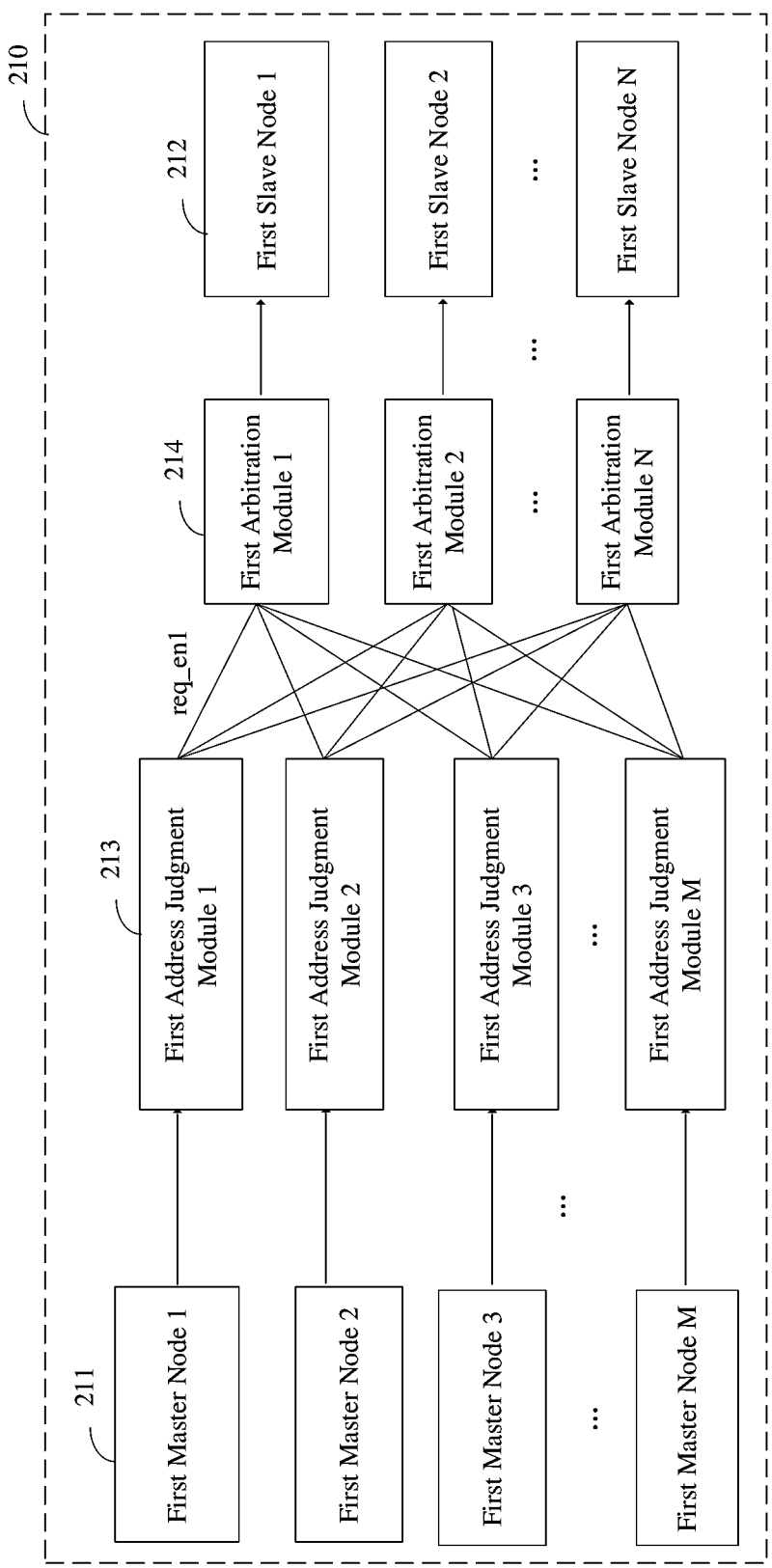
FIG. 3 is an application example diagram of an input interface of a complex computing device according to an embodiment of the present application.

As shown in FIGS. 2 and 3, the input interface 210 supports M first master nodes 211 and N first slave nodes 212, and at most M (when M<N) or N (when M>N) paths may be simultaneously gated. As shown in FIG. 3, there are two paths gated simultaneously, that is, a first master node 2 and a first slave node N are gated, and also a first master node M and a first slave node 1 are gated, respectively. Where M is the number of the instruction source (e.g., AI processor core 100) and N is the number of the computing types of the complex computing instructions.

In one embodiment, the first master node 210 acquires the corresponding complex computing instruction from the connected AI processor core 100 via a handshake protocol. For example, the first master node M receives the instruction request signal req1, and when the first slave node 1 gates the first master node M through arbitration, the instruction response signal gnt1 of the first master node M is valid, that is, the input req1 and the output gnt1 are handshaking signals, indicating that the data transmission is completed and the next data transmission can be initiated.

Figure 4:
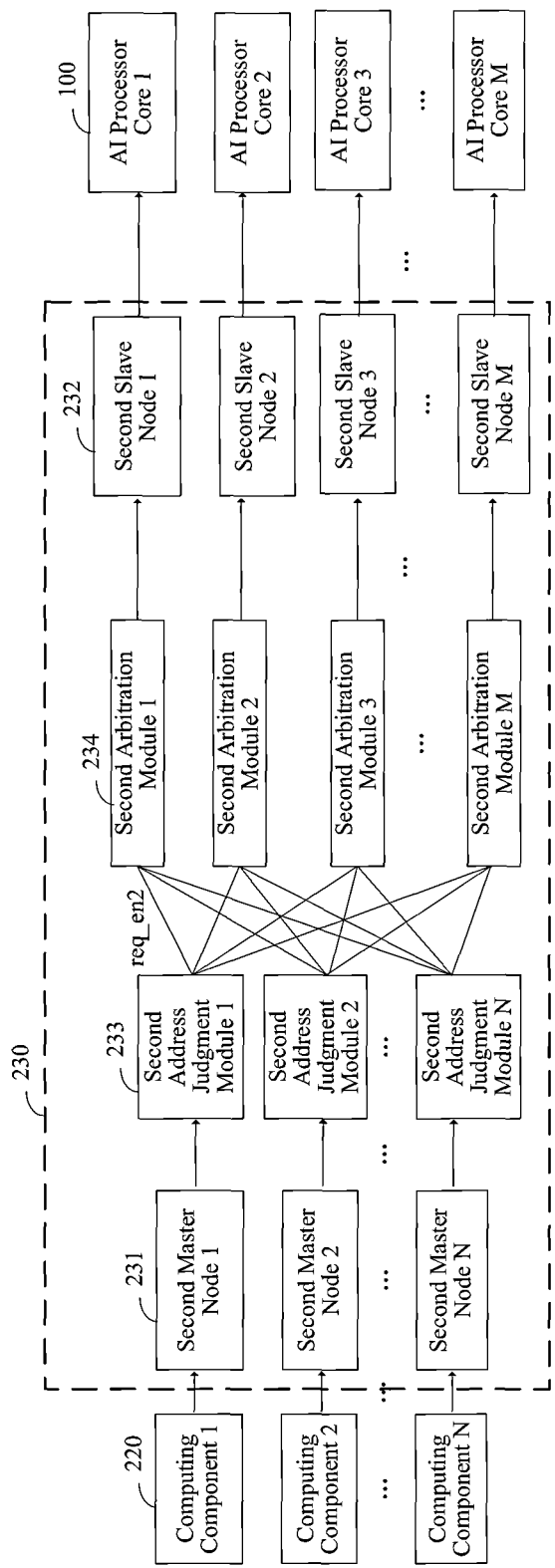
FIG. 4 is a schematic structural diagram of an output interface of a complex computing device according to an embodiment of the present application.

In one embodiment, as shown in FIG. 4, the output interface 230 includes a plurality of second master nodes 231 and a plurality of second slave nodes 232. Each second master node 231 is connected to each computing component in one-to-one correspondence mode, and each second slave node 232 is connected to each second master node 231 respectively. That is, the output interface 230 may also be of the master-slave structure type. In one example, each second slave node 232 is connected in one-to-one correspondence with each artificial intelligence processor core 100.

Therefore, the second master node 231 can acquire a corresponding computing result instruction from the connected computing component and arbitrate the acquired computing result instruction to the corresponding second slave node 232, according to the instruction source identifier in the acquired computing result instruction; the second slave node 232 may send the received computing result instruction to the corresponding instruction source, such as the AI processor core 100 connected to the second slave node 232. The computing result instruction also includes a computing result and a write-back address, and the AI processor core 100 writes the computing result into the internal register according to the write-back address.

In one embodiment, as shown in FIG. 4, the input interface may further include a plurality of second address judgment modules 233 and a plurality of second arbitration modules 234, wherein each second master node 231 is connected to each second address judgment module 233 in one-to-one correspondence manner, each second arbitration module 234 is connected to each second address judgment module 233, and each second arbitration module 234 is connected to each second slave node 232 in one-to-one correspondence manner.

Accordingly, the second address judgment module 233 may receive the corresponding computing result instruction sfu_dout from the connected second master node 231, compare the instruction source identifier in the received computing result instruction sfu_dout with each connected second slave node 232, and output a second request enabling valid signal, i.e., req_en2 is valid, if the comparison result is they are matched.

In one example, the data in each second master node 231 includes a result request signal req2, a second address signal addr2, a second data signal data2, and a result response signal gnt2. The second address signal addr2 includes the instruction source identifier in a computing result instruction sfu_dout, and the second data signal data2 includes a computing result, a write-back address and the like in a computing result instruction sfu_dout. That is, each second master node 231, after receiving the computing result instruction sfu_dout, takes the instruction source identifier in the computing result instruction sfu_dout as the second address signal addr2 of the second master node 231, and takes the computing result and the write-back address, etc. in the computing result instruction sfu_dout as the second data signal data2 of the second master node 231.

Each second address judgment module 233 compares the second address signal addr2 of the second master node 231 connected to the second address judgment module 233 with the sequence number of each second slave node 232. If they are matched, req_en2 is outputted as a valid signal (a second request enabling valid signal) to the second arbitration module 234 connected to the corresponding second slave node 232; if they are not matched, req_en2 is outputted as an invalid signal (second request enabling invalid signal). Here, "matched" may be equal.

The second arbitration module 234 determines a second target request enabling valid signal from a plurality of outputted second request enabling valid signals according to a preset arbitration algorithm, and gates the second master node 231 corresponding to the second target request enabling valid signal and the second slave node 232 connected to the second arbitration module 234.

In one example, the data in each second slave node 232 includes a valid signal vld' and a data signal data". Each second slave node 232 corresponds to one second arbitration module 234. The second arbitration module 234 receives req_en2 signals generated by the second address judgment modules 233 to which all of the second master nodes 231 are connected, and performs arbitration selection on the valid req_en2 signal to gate one second master node 231 therefrom, i.e., gates the second master node 231 corresponding to the second target request enabling valid signal and the second slave node 232 connected to the second arbitration module 234. When a second master node 231 and a second slave node 232 are gated, the signal data2 of the second master node 231 may be assigned to the signal data" of the second slave node 232 and the vld' signal of the second slave node is set as valid.

Figure 5:
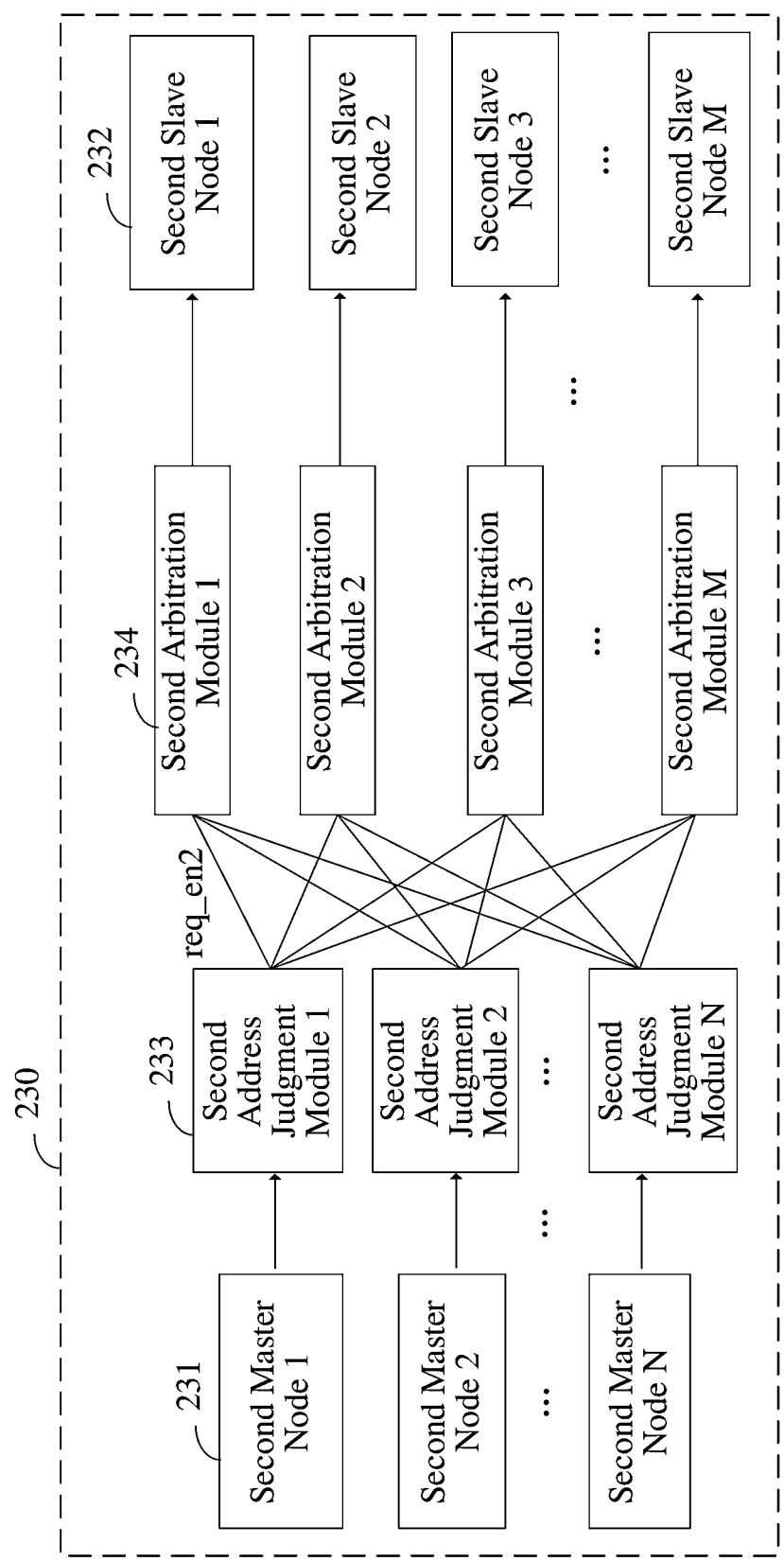
FIG. 5 is an application example diagram of an output interface of a complex computing device according to an embodiment of the present application.

As shown in FIGS. 4 and 5, the output interface supports N second master nodes 231 and M second slave nodes 232, and at most M (when M<N) or N (when M>N) paths can be simultaneously gated. As shown in FIG. 5, there are two paths gated simultaneously, that is, a second master node 1 and a second slave node 3 are gated, and also a second master node N and a second slave node 1 are gated, respectively.

The number of the component components 220 may be N or greater. For example, when it is found in actual use that the usage frequency of a certain computing type is much higher than that of other computing types, the computational power may be increased by increasing the number of the computing component 220 corresponding to the computing type, as long as the number of the first slave nodes 212 and the number of the second master nodes 231 are increased accordingly.

In one embodiment, the second master node 231 acquires the corresponding computing result instruction from the connected computing component 220 via a handshake protocol. For example, the second master node 1 receives the result request signal req2, and when the second slave node 3 gates the second master node 1 through arbitration, the instruction response signal gnt2 of the second master node 1 is valid, i.e. the input req2 and the output gnt2 are handshaking signals, indicating that the data transmission is completed and the next data transmission can be initiated.

A traditional AI chip provides a separate data cache path both in the stage of sending an instruction request and in the stage of writing back a computing result, when implementing each type of complex computing instruction. When there are many computing types of complex computing instructions, these data cache paths occupy large area resources and cause resource waste. In addition, a special data path is arranged for each type of SFU instruction, and when the instructions need to be expanded, corresponding data paths need to be additionally added either, which does not facilitate expansion of SFU and reuse of data paths.

The complex computing device 200 in the embodiment can adopt the input interface 210 and the output interface 230 in the form of a crossbar, so that the area occupation can be reduced, and the area of an AI chip 10 can be reduced; moreover, the crossbar supports flexible configuration and is convenient to be adapted to different numbers of instruction sources (such as the AI processor cores 100) and different the numbers of complex computing types; further, it is also possible to flexibly expand the number of the computing components 220 according to requirements, to improve concurrency and computational power, thereby improving the performance of the AI chip 10.

Figure 6:
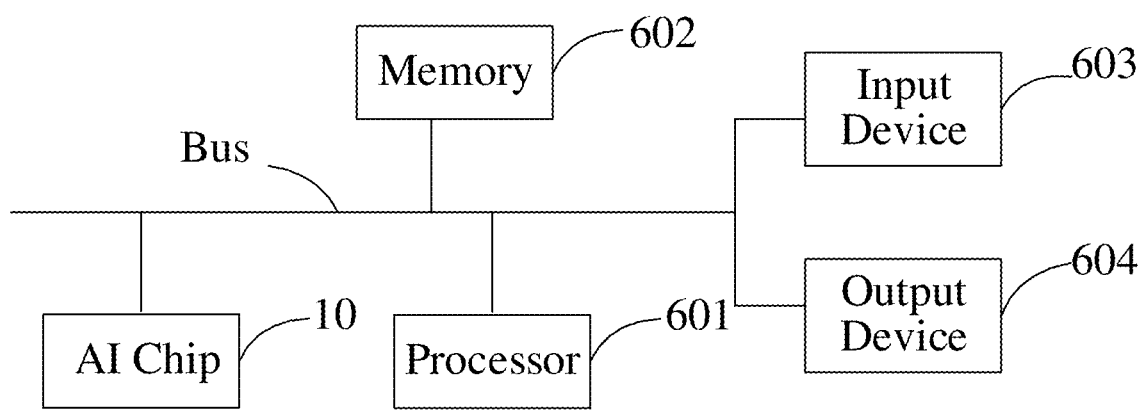
FIG. 6 is a schematic structural diagram of an electronic apparatus according to an embodiment of the present application.

FIG. 6 shows a schematic structural diagram of an electronic apparatus according to an embodiment of the present application. As shown in FIG. 6, the electronic apparatus is intended to represent various forms of digital computers, such as laptop computers, desktop computers, workstations, personal digital assistants, servers, blade servers, mainframe computers, and other suitable computers. The electronic apparatus may also represent various forms of mobile devices, such as personal digital processing, cellular telephones, smartphones, wearable apparatuses, and other similar computing devices. The components are shown herein, their connections and relationships, and their functions are by way of example only and are not intended to limit the implementations of the application described and/or claimed herein.

As shown in FIG. 6, the electronic apparatus includes one or more processors 601, a memory 602, one or more AI chips 10, and interfaces for connecting components, including high-speed interfaces and low-speed interfaces. The various components are interconnected using different buses and may be mounted on a common motherboard or otherwise as desired. The processor may process instructions for execution within the electronic apparatus, including instructions stored in memory or in memory to display graphical information of the GUI on an external input/output device, such as a display apparatus coupled to the interface. In other embodiments, multiple processors and/or multiple buses may be used with multiple memories, if desired. Likewise, multiple electronic apparatuses may be connected, each providing some of the necessary manipulations (e.g., as an array of servers, a set of blade servers, or a multiprocessor system). An example of a processor 601 is shown in FIG. 6.

The electronic apparatus may further include an input device 603 and output device 604. The processor 601, memory 602, input device 603, and output device 604 may be connected by a bus or other means, exemplified by a bus connection in FIG. 6.

The input device 603 may receive input numeric or character information and generate key signal input related to user settings and functional controls of an electronic apparatus representing the shape of an obstacle. The input device is for example a touch screen, a keypad, a mouse, a track pad, a touch pad, an indicating arm, one or more mouse buttons, a trackball, a joystick, and the like. The output device 604 may include a display apparatus, auxiliary lighting device (e.g., LED), tactile feedback device (e.g., vibration motor), etc. The display apparatus may include, but is not limited to, a liquid crystal display (LCD), a light-emitting diode (LED) display, and a plasma display. In some preferred embodiments, the display apparatus may be a touch screen.

To provide interaction with a user, the systems and techniques described herein may be implemented on a computer having: a display device (e.g., a CRT (cathode ray tube) or LCD (liquid crystal display) monitor) for displaying information to a user; and a keyboard and a pointing device (e.g., a mouse or a trackball) through which a user can provide the input to the computer. Other types of devices may also be used to provide an interaction with a user; for example, the feedback provided to the user may be any form of sensory feedback (e.g., visual feedback, auditory feedback, or tactile feedback); and the input from the user may be received in any form, including acoustic input, voice input, or tactile input.

Figure 7:
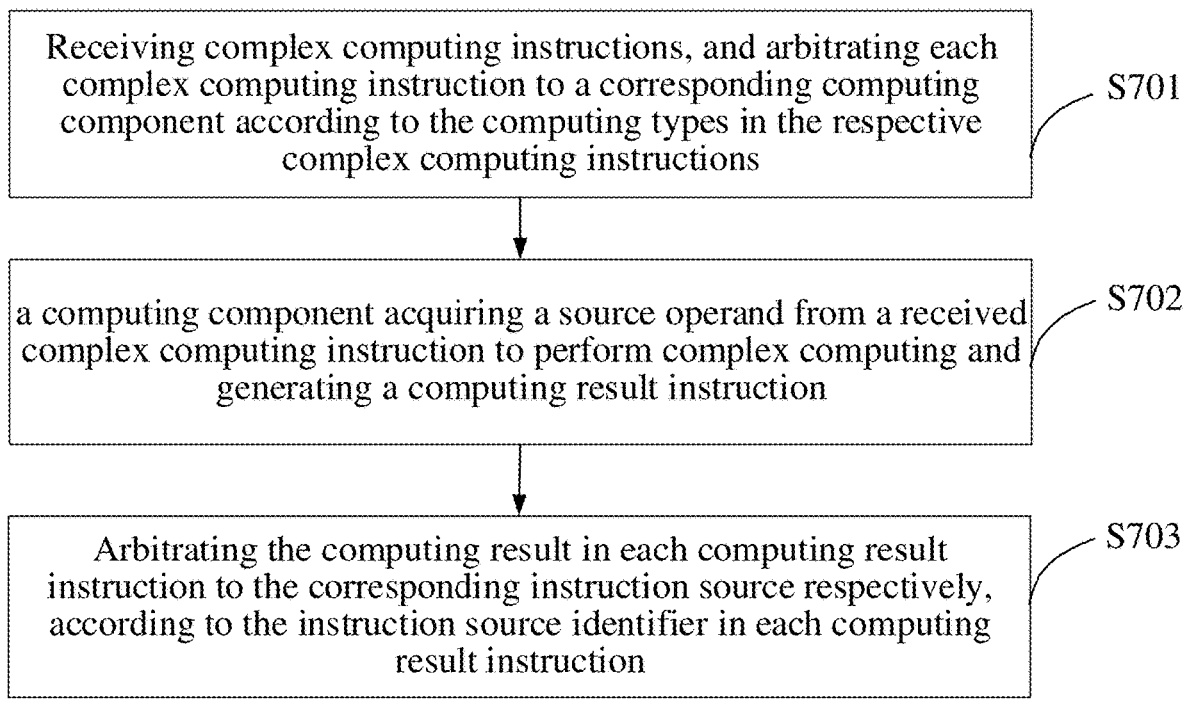
FIG. 7 is a schematic diagram of a complex computing method according to an embodiment of the present application.

FIG. 7 illustrates a complex computing method according to an embodiment of the present application, including:

S701, receiving complex computing instructions, and arbitrating each complex computing instruction to a corresponding computing component according to the computing types in the respective complex computing instructions, wherein the complex computing instruction further includes an instruction source identifier of an artificial intelligence processor core and a source operand for complex computing;

S702, a computing component acquiring a source operand from a received complex computing instruction to perform complex computing and generating computing result instruction, wherein the computing result instruction includes an instruction source identifier in the complex computing instruction and a computing result of the complex computing; and S703, arbitrating the computing result in each computing result instruction to the corresponding instruction source respectively, according to the instruction source identifier in each computing result instruction.

In one embodiment, the methods according to the embodiments of the present application may be performed by the complex computing device 200 described above, for example, S701 may be performed by the input interface 210 and S703 may be performed by the output interface 230.

It should be understood that an operation or a step may be reordered, added, amended or deleted with respect to various forms of the flows as shown above. For example, the respective steps recited in the present application may be performed in parallel or sequentially or may be performed in a different order, so long as the desired result of the technical solutions disclosed in the present application can be achieved, and no limitation is made herein.

Furthermore, the terms "first" and "second" are used for descriptive purposes only and are not to be construed as indicating or implying relative importance or implicitly indicating the number of technical features indicated. Therefore, features defining "first" and "second" may explicitly or implicitly include one or more such features. In the description of the present application, the meaning of "a plurality" or "multiple" is two or more unless specifically defined otherwise. The term "connected" is to be construed broadly and may, for example, be directly connected or indirectly connected through an intermediary. The specific meaning of the above terms in this application will be understood by those of ordinary skills in the art, as the case may be.

The above-mentioned embodiments are not to be construed as limiting the scope of the present application. It will be apparent to those skilled in the art that various modifications, combinations, sub-combinations and substitutions are possible, depending on design requirements and other factors. Any modifications, equivalents, improvements, etc. that come within the spirit and principles of the present application are intended to be included within the scope of the present application.

What is claimed is:

1. A complex computing device, comprising an input interface, a plurality of computing component circuits and an output interface, wherein:

the input interface is configured for receiving complex computing instructions and arbitrating each of the complex computing instructions to a corresponding computing component circuit, respectively, according to computing types in the complex computing instructions, wherein each of the complex computing instructions further comprises an instruction source identifier and a source operand for complex computing;

each of the plurality of computing component circuits is connected to the input interface, and a given computing component circuit of the plurality of computing component circuits is configured for acquiring the source operand from a first received complex computing instruction, of the complex computing instructions, to perform first complex computing, and generating a computing result instruction to feed back to the output interface, wherein the computing result instruction comprises the instruction source identifier in the first received complex computing instruction and a computing result of the first complex computing;

the output interface is configured for arbitrating a first computing result in each of a plurality of computing result instructions to a corresponding instruction source, respectively, according to an instruction source identifier in each of the plurality of computing result instructions;

the input interface comprises a plurality of first master node circuits and a plurality of first slave node circuits, each of the plurality of first slave node circuits is connected to each of the plurality of first master node circuits, respectively, and each of the plurality of first slave node circuits is connected to each of the computing component circuits in one-to-one correspondence;

a given first master node circuit of, the plurality of first master node circuits, acquires a first complex computing instruction including a first instruction source identifier and a first source operand, and arbitrates the acquired first complex computing instruction to a corresponding first slave node circuit according to a first computing type in the acquired first complex computing instruction;

a given first slave node circuit, of the plurality of first slave node circuits, is configured for sending a received complex computing instruction to the computing component circuit connected thereto;

the input interface further comprises a plurality of first address judgment module circuits and a plurality of first arbitration module circuits, each of the first master node circuits is connected to each of the plurality of first address judgment module circuits in one-to-one correspondence, each of the plurality of first arbitration module circuits is connected to each of the plurality of first address judgment module circuits, respectively, and each of the plurality of first arbitration module circuits is connected to each of the first slave node circuits in one-to-one correspondence;

a given first address judgment module circuit, of the plurality of first address judgment module circuits, is configured for receiving a corresponding complex computing instruction, of the complex computing instructions, from the connected first master node circuit, comparing a computing type in the received corresponding complex computing instruction with each connected first slave node circuit to determine whether there is a first slave node circuit that matches the computing type in the received corresponding complex computing instruction, and outputting a first request enabling valid signal in response to a result of the comparing being that there is the first slave node circuit that matches the computing type in the received corresponding complex computing instruction; and a given first arbitration module circuit of, the plurality of first arbitration module circuits, is configured for determining a first target request enabling valid signal from a plurality of outputted first request enabling valid signals according to a preset arbitration algorithm, and gating the first master node circuit corresponding to the first target request enabling valid signal and the first slave node circuit connected to the given first arbitration module circuit.

2. The complex computing device of claim 1, wherein:
the input interface and the output interface are both of a crossbar switch array configuration.

3. The complex computing device of claim 1, wherein:
an output data of the given first master node circuit comprises a first address signal and a first data signal, the first address signal comprises the first computing type, and the first data signal comprises the first instruction source identifier and the first source operand; the given first address judgment module circuit being configured for receiving a corresponding first address signal from the connected first master node circuit and comparing the received first address signal with a sequence number of each connected first slave node circuit; the given first slave node circuit being configured for receiving a corresponding first data signal from the gated first master node circuit.

4. The complex computing device of claim 1, wherein:
the given first master node circuit receives the first complex computing instruction through a handshake protocol.

5. The complex computing device of claim 1, wherein:
the output interface comprises a plurality of second master node circuits and a plurality of second slave node circuits, each of the plurality of second master node circuits is connected to each of the computing component circuits in one-to-one correspondence, and each of the plurality of second slave node circuits is connected to each of the plurality of second master node circuits, respectively;

a given second master node circuit of, the plurality of second master node circuits, acquires a corresponding computing result instruction, of the plurality of computing result instructions, from a connected computing component circuit, and arbitrates the acquired computing result instruction to a corresponding second slave node circuit, according to the instruction source identifier in the acquired computing result instruction; and a given second slave node circuit of, the plurality of second slave node circuits, is configured for sending a received computing result instruction to a corresponding instruction source.

6. The complex computing device of claim 5, wherein:
the output interface further comprises a plurality of second address judgment module circuits and a plurality of second arbitration module circuits, each of the second master node circuits is connected to each of the plurality of second address judgment module circuits in one-to-one correspondence, and each of the plurality of second arbitration module circuits is connected to each of the plurality of second address judgment module circuits, respectively;

a given second address judgment module circuit of, the plurality of second address judgment module circuits, is configured for receiving a corresponding computing result instruction, of the plurality of computing result instructions, from the connected second master node circuit, comparing the instruction source identifier in the received corresponding computing result instruction with each connected second slave node circuit to determine whether there is a second slave node circuit that matches the instruction source identifier in the received corresponding computing result instruction, and outputting a second request enabling valid signal in response to a result of the comparing of the instruction source identifier in the received corresponding computing result instruction with each connected second slave node circuit being that there is the second slave node circuit that matches the instruction source identifier in the received corresponding computing result instruction; and a given second arbitration module circuit of, the plurality of second arbitration module circuits, is configured for determining a second target request enabling valid signal from a plurality of outputted second request enabling valid signals, according to a preset arbitration algorithm, and gating the second master node circuit corresponding to the second target request enabling valid signal and the second slave node circuit connected to the given second arbitration module circuit.

7. The complex computing device of claim 6, wherein:
an output data of the given second master node circuit comprises a second address signal and a second data signal, the second address signal comprises the first instruction source identifier, and the second data signal comprises the first computing result of the received corresponding computing result instruction; the given second address judgment module circuit being configured for receiving a corresponding second address signal from the connected second master node circuit and comparing the received second address signal with a sequence number of each connected second slave node circuit; the given second slave node circuit being configured for receiving a corresponding second data signal from the gated second master node circuit.

8. The complex computing device of claim 5, wherein:
the given second master node circuit acquires the corresponding computing result instruction from the connected computing component circuit through a handshake protocol.

9. An artificial intelligence chip, comprising a complex computing device, and a plurality of instruction sources connected to the complex computing device; wherein the complex computing device comprises an input interface, a plurality of computing component circuits and an output interface, wherein:
the input interface is configured for receiving complex computing instructions and arbitrating each of the complex computing instructions to a corresponding computing component circuit, respectively, according to computing types in the complex computing instructions, wherein each of the complex computing instructions further comprises an instruction source identifier and a source operand for complex computing;
each of the plurality of computing component circuits is connected to the input interface, and a given computing component circuit of the plurality of computing component circuits is configured for acquiring the source operand from a first received complex computing instruction, of the complex computing instructions, to perform first complex computing, and generating a computing result instruction to feed back to the output interface, wherein the computing result instruction comprises the instruction source identifier in the first received complex computing instruction and a computing result of the first complex computing;

the output interface is configured for arbitrating a first computing result in each of a plurality of computing result instructions to a corresponding instruction source, respectively, according to an instruction source identifier in each of the plurality of computing result instructions;

the input interface comprises a plurality of first master node circuits and a plurality of first slave node circuits, each of the plurality of first slave node circuits is connected to each of the plurality of first master node circuits, respectively, and each of the plurality of first slave node circuits is connected to each of the computing component circuits in one-to-one correspondence;

a given first master node circuit, of the plurality of first master node circuits, acquires a first complex computing instruction including a first instruction source identifier and a first source operand, and arbitrates the acquired first complex computing instruction to a corresponding first slave node circuit according to a first computing type in the acquired first complex computing instruction;

a given first slave node circuit, of the plurality of first slave node circuits, is configured for sending a received complex computing instruction to the computing component circuit connected thereto;

the input interface further comprises a plurality of first address judgment module circuits and a plurality of first arbitration module circuits, each of the first master node circuits is connected to each of the plurality of first address judgment module circuits in one-to-one correspondence, each of the plurality of first arbitration module circuits is connected to each of the plurality of first address judgment module circuits, respectively, and each of the plurality of first arbitration module circuits is connected to each of the first slave node circuits in one-to-one correspondence;

a given first address judgment module circuit, of the plurality of first address judgment module circuits, is configured for receiving a corresponding complex computing instruction, of the complex computing instructions, from the connected first master node circuit, comparing a computing type in the received corresponding complex computing instruction with each connected first slave node circuit to determine whether there is a first slave node circuit that matches the computing type in the received corresponding complex computing instruction, and outputting a first request enabling valid signal in response to a result of the comparing being that there is the first slave node circuit that matches the computing type in the received corresponding complex computing instruction; and a given first arbitration module circuit, of the plurality of first arbitration module circuits, is configured for determining a first target request enabling valid signal from a plurality of outputted first request enabling valid signals according to a preset arbitration algorithm, and gating the first master node circuit corresponding to the first target request enabling valid signal and the first slave node circuit connected to the given first arbitration module circuit.

10. The artificial intelligence chip of claim 9, wherein:
each of the plurality of instruction sources comprises an artificial intelligence processor core.

11. The artificial intelligence chip of claim 9, wherein:
an output data of the given first master node circuit comprises a first address signal and a first data signal, the first address signal comprises the first computing type, and the first data signal comprises the first instruction source identifier and the first source operand; the given first address judgment module circuit being configured for receiving a corresponding first address signal from the connected first master node circuit and comparing the received first address signal with a sequence number of each connected first slave node circuit; the given first slave node circuit being configured for receiving a corresponding first data signal from the gated first master node circuit.

12. The artificial intelligence chip of claim 9, wherein:
the output interface in the complex computing device comprises a plurality of second master node circuits and a plurality of second slave node circuits, each of the plurality of second master node circuits is connected to each of the computing component circuits in one-to-one correspondence, and each of the plurality of second slave node circuits is connected to each of the plurality of second master node circuits, respectively;
a given second master node circuit of, the plurality of second master node circuits, acquires a corresponding computing result instruction, of the plurality of computing result instructions, from a connected computing component circuit, and arbitrates the acquired computing result instruction to a corresponding second slave node circuit, according to the instruction source identifier in the acquired computing result instruction; and
a given second slave node circuit of, the plurality of second slave node circuits, is configured for sending a received computing result instruction to a corresponding instruction source.

13. The artificial intelligence chip of claim 12, wherein:
the output interface further comprises a plurality of second address judgment module circuits and a plurality of second arbitration module circuits, each of the second master node circuits is connected to each of the plurality of second address judgment module circuits in one-to-one correspondence, and each of the plurality of second arbitration module circuits is connected to each of the plurality of second address judgment module circuits, respectively;
a given second address judgment module circuit of, the plurality of second address judgment module circuits, is configured for receiving a corresponding computing result instruction, of the plurality of computing result instructions, from the connected second master node circuit, comparing the instruction source identifier in the received corresponding computing result instruction with each connected second slave node circuit to determine whether there is a second slave node circuit that matches the instruction source identifier in the received corresponding computing result instruction, and outputting a second request enabling valid signal in response to a result of the comparing of the instruction source identifier in the received corresponding computing result instruction with each connected second slave node circuit being that there is the second slave node circuit that matches the instruction source identifier in the received corresponding computing result instruction; and
a given second arbitration module circuit of, the plurality of second arbitration module circuits, is configured for determining a second target request enabling valid signal from a plurality of outputted second request enabling valid signals, according to a preset arbitration algorithm, and gating the second master node circuit corresponding to the second target request enabling valid signal and the second slave node circuit connected to the given second arbitration module circuit.

14. An electronic apparatus, comprising at least one processor, at least one memory and at least one said artificial intelligence chip as claimed in claim 9, which are communicatively connected.

15. The electronic apparatus according to claim 14, wherein:
each of a plurality of instruction sources in each of the at least one artificial intelligence chip comprises an artificial intelligence processor core.

16. A complex computing method, performed by a complex computing device comprising an input interface, a plurality of computing component circuits and an output interface, each of the plurality of computing component circuits connected to the input interface, the method comprising:
the input interface receiving complex computing instructions, and arbitrating each of the complex computing instructions to a corresponding computing component circuit respectively, according to computing types in the complex computing instructions, wherein each of the complex computing instructions further comprises an instruction source identifier and a source operand for complex computing;
a given computing component circuit of the plurality of computing component circuits acquiring the source operand from a first received complex computing instruction, of the complex computing instructions, to perform first complex computing and generating a computing result instruction to feed back to the output interface, wherein the computing result instruction comprises the instruction source identifier in the first received complex computing instruction and a computing result of the first complex computing; and
the output interface arbitrating a first computing result in each of a plurality of computing result instructions to a corresponding instruction source, respectively, according to an instruction source identifier in each of the plurality of computing result instructions;
wherein: the input interface comprises a plurality of first master node circuits and a plurality of first slave node circuits, each of the plurality of first slave node circuits is connected to each of the plurality of first master node circuits, respectively, and each of the plurality of first slave node circuits is connected to each of the computing component circuits in one-to-one correspondence;
a given first master node circuit of, the plurality of first master node circuits, acquires a first complex computing instruction including a first instruction source identifier and a first source operand, and arbitrates the acquired first complex computing instruction to a corresponding first slave node circuit according to a first computing type in the acquired first complex computing instruction;
a given first slave node circuit of, the plurality of first slave node circuits, is configured for sending a received complex computing instruction to the computing component circuit connected thereto;
the input interface further comprises a plurality of first address judgment module circuits and a plurality of first arbitration module circuits, each of the first master node circuits is connected to each of the plurality of first address judgment module circuits in one-to-one correspondence, each of the plurality of first arbitration module circuits is connected to each of the plurality of first address judgment module circuits, respectively, and each of the plurality of first arbitration module circuits is connected to each of the first slave node circuits in one-to-one correspondence;

a given first address judgment module circuit, of the plurality of first address judgment module circuits, is configured for receiving a corresponding complex computing instruction, of the complex computing instructions, from the connected first master node circuit, comparing a computing type in the received corresponding complex computing instruction with each connected first slave node circuit to determine whether there is a first slave node circuit that matches the computing type in the received corresponding complex computing instruction, and outputting a first request enabling valid signal in response to a result of the comparing being that there is the first slave node circuit that matches the computing type in the received corresponding complex computing instruction; and a given first arbitration module circuit of, the plurality of first arbitration module circuits, is configured for determining a first target request enabling valid signal from a plurality of outputted first request enabling valid signals according to a preset arbitration algorithm, and gating the first master node circuit corresponding to the first target request enabling valid signal and the first slave node circuit connected to the given first arbitration module circuit.

\* \* \* \* \*